(12) United States Patent
Randerson

(10) Patent No.: US 6,481,562 B2
(45) Date of Patent: Nov. 19, 2002

(54) CONVEYOR BELT SCRAPER BLADE

(75) Inventor: Ivan Randerson, Doncaster (GB)

(73) Assignee: R H Conveyor Services Limited (GB)

( * ) Notice: Subject to any disclaimer, the term of this patent is extended or adjusted under 35 U.S.C. 154(b) by 73 days.

(21) Appl. No.: 09/741,202

(22) Filed: Dec. 19, 2000

(65) Prior Publication Data
US 2001/0011400 A1 Aug. 9, 2001

(30) Foreign Application Priority Data

Jan. 18, 2000 (GB) .............................................. 0001019

(51) Int. Cl.$^7$ ................................................ B65G 45/00
(52) U.S. Cl. ..................... 198/499; 15/256.51
(58) Field of Search ............................ 198/499, 497, 198/498; 15/256.51, 256.6

(56) References Cited

U.S. PATENT DOCUMENTS 4,662,507 A 5/1987 Veenhof
5,007,523 A 4/1991 Morefield
5,197,587 A 3/1993 Malmberg
5,301,797 A 4/1994 Hollyfield, Jr. et al.

FOREIGN PATENT DOCUMENTS

EP 0262272 4/1988
GB 2239228 6/1991

OTHER PUBLICATIONS

A Search Report which issued in connection with a corresponding British patent application.

Primary Examiner—Kenneth W. Noland
(74) Attorney, Agent, or Firm—Trexler, Bushnell, Giangiorgi, Blackstone & Marr, Ltd.

(57) ABSTRACT

A scraper blade (1, 1A) for a belt conveyor (8), the scraper consists of, or incorporates, a plurality of resilient fingers (3, 3A) adapted at one end (5) of each finger (3, 3A) to engage the belt surface (6) for scraping purposes and at the other end to be supported in suitable proximity to the belt surface (6) to be scraped, with the individual fingers (3, 3A) capable of deflection upon encountering any projection (10) such as a mound or joint of the belt surface (6).

8 Claims, 4 Drawing Sheets

CONVEYOR BELT SCRAPER BLADE

BACKGROUND OF THE INVENTION

It is well known to provide a transverse scraper blade to engage the material carrying surface of the belt of an endless belt conveyor, with a view to scraping from that surface any material still adhering, following discharge of the material being conveyed from a discharge, or head, end of the conveyor. Conventionally, a scraper blade is located transversely of the conveyor belt, and of its direction of movement, at a zone where the belt begins its return run after passing over the head roller. Also conventionally, scraper blades are resiliently urged into contact with the belt surface by their support structure usually incorporating springs, so that the blade may deflect upon encountering a joint in the belt, which joint could be either a vulcanised joint or, more commonly, an array of metallic belt fastening hooks extending across the full width of the conveyor, which joint unavoidably constitutes a projection from the belt surface.

Whilst such a scraper blade is effective, to a greater or lesser extent, on a belt having a planar or relatively smooth, belt conveying surface, the material carrying surfaces of some belts are provided with an array of projections in the form of mounds, ribs etc., for better conveyance of material in circumstances where uphill, or a section of uphill conveying, is required, Such belts have always presented a scraping and cleaning problem and previous proposals have included rotary wire brushes and rollers with wrapper bars etc., in attempts to detach material adhering to the belt surface.

OBJECT OF THE INVENTION

A basic object of the present invention is the provision of an improved conveyor belt scraper blade over previous proposals, particularly for use with belts having non-planar surfaces, and to a belt conveyor incorporating at least one such scrape blade.

SUMMARY OF THE FIRST ASPECT OF THE INVENTION

According to a first aspect of the present invention, there is provided a scraper blade for a belt conveyor, comprising an elongate strip of synthetic plastics material, with an array of parallel cuts made into the strip from one lateral side towards the other lateral side, so as to define individual fingers between the cuts or kerfs, with the cuts extending to about half the width of the strip, so that the fingers are integral with the remaining, uncut portion of the strip, with one end of each finger adapted to engage the belt surface for scraping purposes and at the other end to be supported in suitable proximity to the belt surface to be scraped, with the individual fingers capable of deflection upon encountering any projection such as a mound or joint of the belt surface.

SUMMARY OF THE SECOND ASPECT OF THE INVENTION

According to a second aspect of the invention there is provided a belt convevor incorporating at least one scraper blade in accordance with the first aspect.

ADVANTAGES OF THE INVENTION

Thus, the scraper blade in accordance with the invention deploys a non-unitary scraping edge comprising the array of fingers, with only the finger(s) that encounters a projection being deflected upon belt movement across the scraper, whereby unlike prior art proposals, the (unitary) blade is not lifted in its entirety from the belt surface, but only the finger(s) that needs to deflect is/are deflected, with the non-deflected fingers remaining in efficient scraping contact with the belt.

PREFERRED FEATURES OF THE INVENTION

Preferably, the synthetic plastics material is polyurethane.

The fingers are rectangular in cross-section.

It is known that different grades, or mixtures, of polyurethane based materials may provide fingers of varying stiffness and resilience and hence varying performance characteristics, and clearly the grade selected should be that most suitable for the scraping task envisaged. It follows that, in producing a scraper blade, usually by pouring or casting flowable polyurethane into a mould, different grades may, be employed to provide different characteristics of stiffness for different parts of the blade.

A single, integral blade extends the full width of the belt involved.

A plurality of relatively short length blade modules are provided, e.g. four to eight, for a belt of one meter width, so that if, as expected, a blade has a propensity for wear in a particular area of the belt, it is only necessary to replace the worn module.

BRIEF DESCRIPTION OF THE DRAWINGS

The invention will now be described in greater detail, with reference to the accompanying drawings, in which

In all Figures, like components are accorded like reference numerals.

In FIG. 1, a scraper blade 1 produced in polyurethane, by casting, comprises a body portion 2 from which project a plurality of integral, individual, resilient fingers 3, separated by slots 4 to define, along one longitudinal edge of the blade 1, finger ends 5 to engage a material conveying surface 6 of an endless belt 7 of a belt conveyor 8 which, as illustrated in FIGS. 3 and 4 passes round a return drum 9 at which the product being conveyed is discharged. The surface 6 could be planar or could have an array of projections 10 to retain positional control of the material being conveyed on uphill or downhill runs. The surface 6 is also interrupted at joints (not shown) between ends of the belt 7, which joints could be either of the vulcanized type or be of the hooked type comprising a plurality of metal belt fastener hooks extending across the width of the belt.

When a projection, of whatever form, strikes one or more fingers 3, the latter deflects, so as to ease passage of the projection past the blade 1. Furthermore, if only some of the fingers 3 are struck by a projection, then the non-struck fingers are not deflected from the surface 6 but remain in scraping contact with the surface 6.

Figure 1:
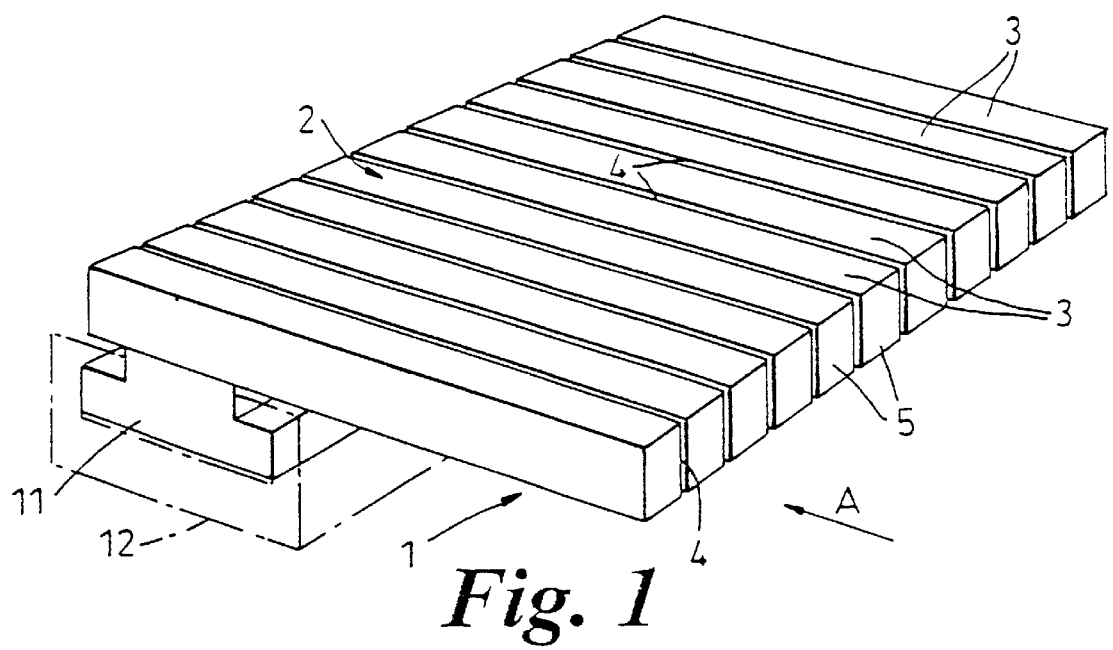
FIG. 1 is a perspective view of a first embodiment of scraper blade in accordance with a first aspect of the invention.
Figure 2:
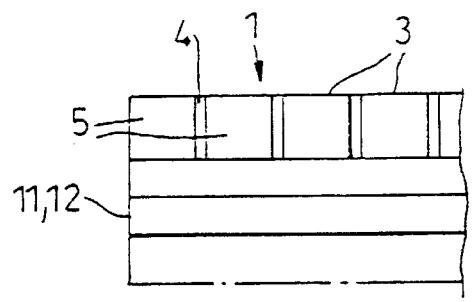
FIG. 2 is a view on arrow A of FIG. 1.
Figure 3:
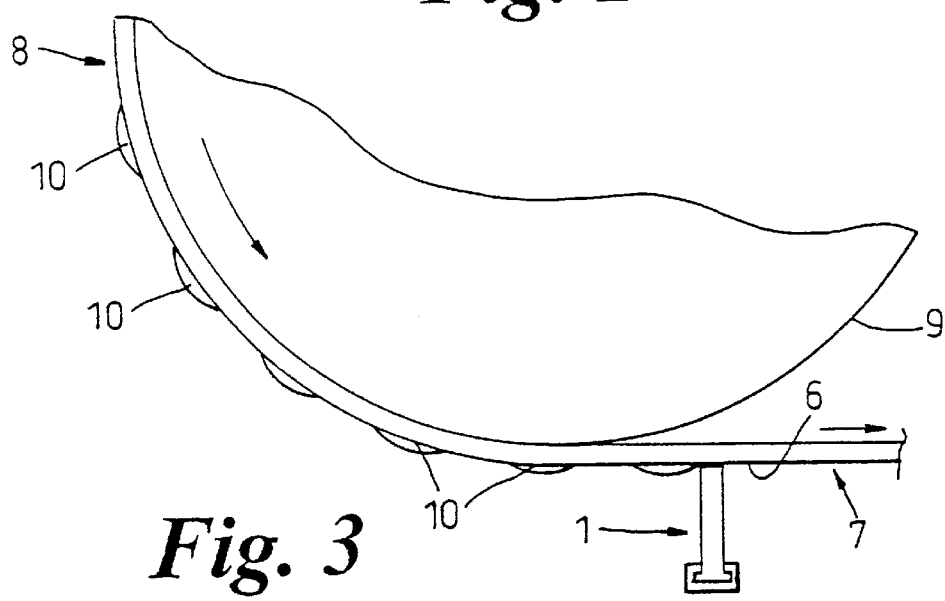
FIG. 3 is a diagrammatic side elevation of a first embodiment of belt convevor in accordance with the second aspect.

As illustrated in FIG. 1, the scraper blade 1 may have embedded therein a portion of a T-section mounting bar 11 adapted to be slid, laterally, into a T-shaped recess of a support bar 12 secured (eg by bolt or welding) to support structure of the conveyor.

Figure 4:
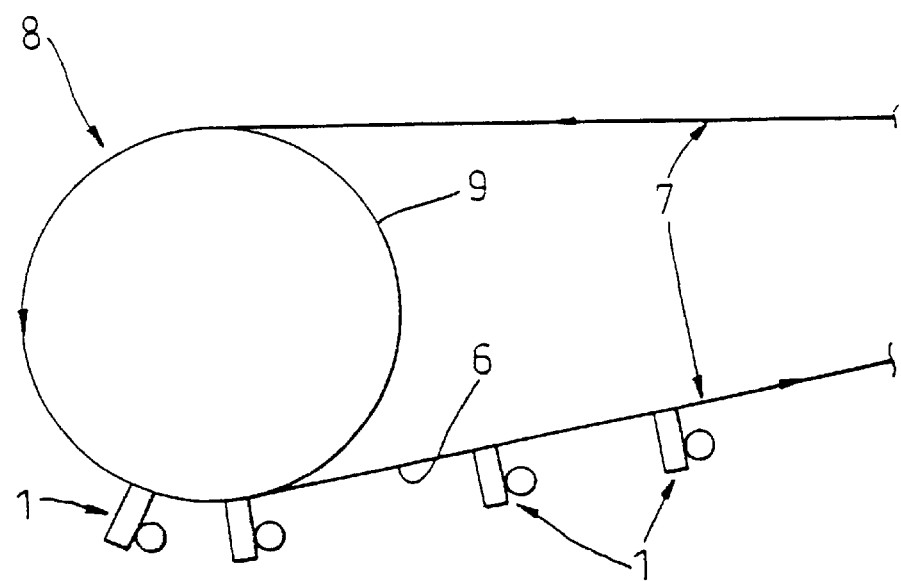
FIG. 4 corresponds to FIG. 3 but shows a second embodiment.

As illustrated in FIG. 4, the scraper blade 1 may be fitted at various preferred locations, and indeed multiple scraper blades 1 may be fitted to deal with removal of particularly adhesive materials.

Figure 6:
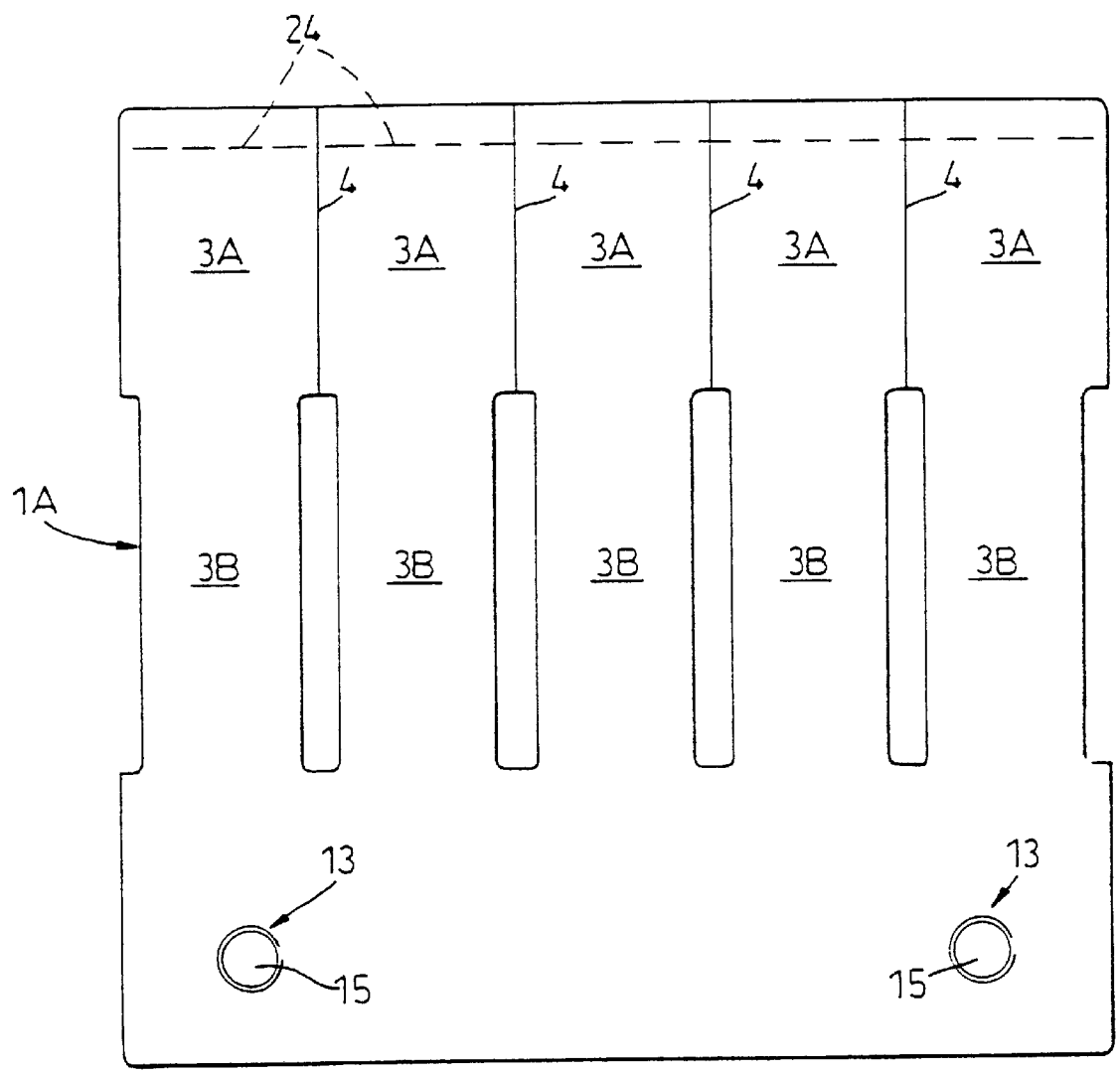
FIG. 6 is a rear elevation of a second embodiment of scraper blade in accordance with the first aspect.
Figure 7:
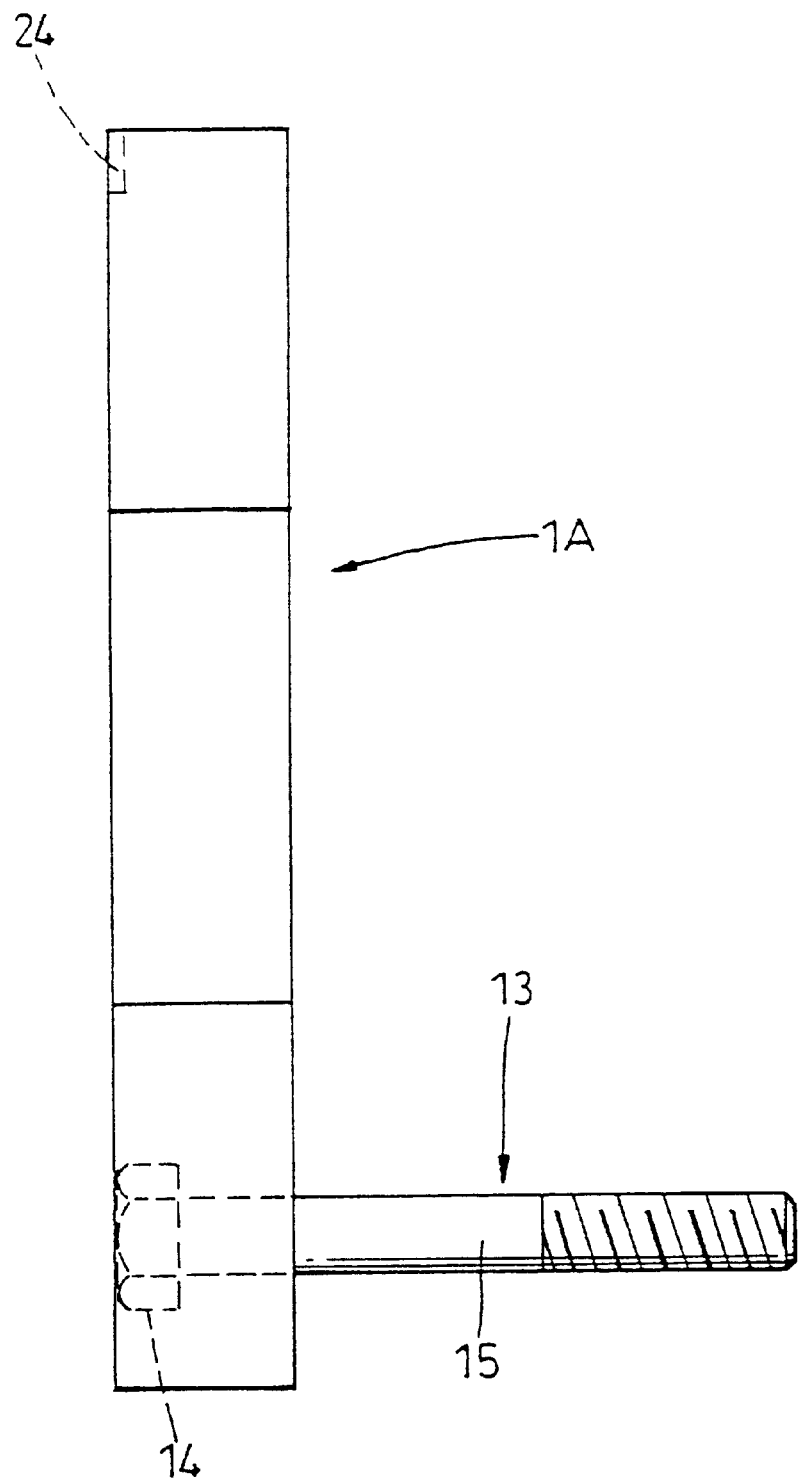
FIG. 7 is a side elevation of FIG. 6.

FIGS. 6 and 7 illustrate a scraper blade module 1A which in use, is butted side-to-side with eg five similar modules to cover the full width eg 1 meter, of a belt 7. It follows that in circumstances of uneven wear, which is not infrequent, only, the worn module need be replaced. Also, the fingers 3A are necked at 3B not only to reduce friction between adjacent fingers 3A but also to increase the flexibility of the fingers 3A.

Figure 5:
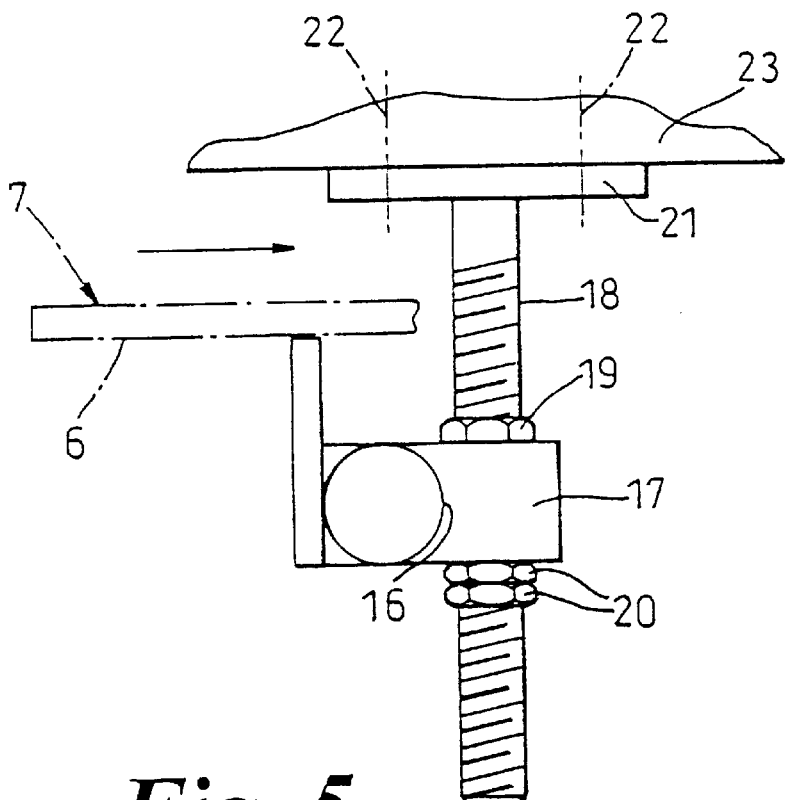
FIG. 5 shows, to a larger scale how a scraper blade of FIG. 4 is fitted to support structure of the convevor.

FIGS. 6 and 7 indicate that two spaced apart bolts 13 have their heads 14 embedded in the polyurethane during casting, whilst threaded stems 15 project to pass through holes in a support tube 16 (FIG. 5) attached to an apertured bracket 17 passed onto a threaded stud 18 with a top nut 19 and two lower nuts 20, the stud 18 being attached at its upper end to a plate 21 secured by bolts (not shown) on centres 22 to support structure 23 of the conveyor structure.

FIGS. 6 and 7 also illustrate that inserts 24 of tungsten carbide may also be embedded in the tips of the fingers 3 during moulding.

What I claim is:

1. A scraper blade for a belt conveyor, comprising an elongate strip of synthetic plastics material, with an array of parallel cuts made into said strip from one lateral side thereof towards the other lateral side thereof, so as to define individual fingers between said cuts, with said cuts extending to approximately half the width of said strip, so that said fingers are integral with the remaining, uncut portion of said strip, with one end of each of said fingers being adapted, in use, to engage a surface of a belt of a belt conveyor for scraping purposes, and with the other end of each of said fingers being adapted to be supported in suitable proximity to said belt surface to be scraped with said fingers being capable of individual deflection upon encountering any projection, such as a mound or joint, of said belt surface.

2. A scraper blade as claimed in claim 1, wherein the synthetic plastics material is polyurethane.

3. A scraper blade as claimed in claim 1, wherein said fingers are rectangular in cross-section.

4. A scraper blade as claimed in claim 1, produced by casting flowable polyurethane into a mould.

5. A scraper blade as claimed in claim 4, wherein different grades of polyurethane are employed to provide different characteristics of stiffness for different parts of said blade.

6. A scraper blade as claimed in claim 1, wherein a single, integral blade extends the full width of the belt involved.

7. A scraper blade as claimed in claim 1, wherein a plurality of relatively short length blade modules are provided, typically four to eight for a belt of 3 ft width.

8. A belt conveyor incorporating at least one scraper blade in accordance with claim 1.

* * * * *